(12) United States Patent
Fuehrer et al.

(10) Patent No.: US 10,644,439 B2
(45) Date of Patent: May 5, 2020

(54) PLUG-IN CONNECTOR PART WITH A COOLED CONTACT ELEMENT

(71) Applicant: Phoenix Contact E-Mobility GmbH, Schieder-Schwalenberg (DE)

(72) Inventors: Thomas Fuehrer, Blomberg (DE); Robert Babezki, Steinheim (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 16/087,100

(22) PCT Filed: Apr. 19, 2017

(86) PCT No.: PCT/EP2017/059216
§ 371 (c)(1),
(2) Date: Sep. 21, 2018

(87) PCT Pub. No.: WO2017/182484
PCT Pub. Date: Oct. 26, 2017

(65) Prior Publication Data
US 2019/0109409 A1 Apr. 11, 2019

(30) Foreign Application Priority Data
Apr. 21, 2016 (DE) .................. 10 2016 107 409

(51) Int. Cl.
*H01M 10/46* (2006.01)
*H01R 13/533* (2006.01)
(Continued)

(52) U.S. Cl.
CPC .............. *H01R 13/533* (2013.01); *B60L 1/04* (2013.01); *B60L 53/16* (2019.02); *B60L 53/18* (2019.02);
(Continued)

(58) Field of Classification Search
CPC ........ H02J 7/355; H02J 7/0042; H02J 7/0091; H02J 7/047; B60L 53/16; B60L 53/18; B60L 53/11
(Continued)

(56) References Cited

U.S. PATENT DOCUMENTS

| | | |
|---|---|---|
| 5,909,099 A | 6/1999 | Watanabe et al. |
| 2009/0239408 A1 | 9/2009 | Sacher et al. |
| 2012/0043935 A1* | 2/2012 | Dyer .............. B60L 1/003 320/109 |
| 2014/0199881 A1 | 7/2014 | Manahan et al. |

(Continued)

FOREIGN PATENT DOCUMENTS

| | | |
|---|---|---|
| DE | 10127488 A1 | 1/2003 |
| DE | 20203315 U1 | 8/2003 |

(Continued)

*Primary Examiner* — Edward Tso
(74) *Attorney, Agent, or Firm* — Leydig, Voit & Mayer, Ltd.

(57) ABSTRACT

A plug-in connector part for connection to a mating plug-in connector part includes: a housing which has a plug-in portion for plug-in connection to the mating plug-in connector part; at least one contact element arranged on the plug-in portion and for electrically contacting an associated mating contact element of the mating plug-in connector part; a thermal conductor line connected to the at least one contact element; and a cooling body arranged in the housing and thermoconductively connected to the at least one contact element via the thermal conductor line in order to dissipate heat from the at least one contact element.

9 Claims, 5 Drawing Sheets

(51) Int. Cl.
*B60L 1/04* (2006.01)
*B60L 53/18* (2019.01)
*B60L 53/16* (2019.01)
*H01B 7/42* (2006.01)
*H01R 9/11* (2006.01)
*B60L 53/10* (2019.01)

(52) U.S. Cl.
CPC .............. *H01B 7/423* (2013.01); *B60L 53/11* (2019.02); *H01R 9/11* (2013.01); *Y02T 10/7005* (2013.01); *Y02T 10/7088* (2013.01); *Y02T 90/121* (2013.01); *Y02T 90/128* (2013.01); *Y02T 90/14* (2013.01)

(58) Field of Classification Search
USPC ........ 320/107, 109, 114, 150, 153; 439/190, 439/196, 201
See application file for complete search history.

(56) References Cited

U.S. PATENT DOCUMENTS

| | | |
|---|---|---|
| 2014/0256167 A1 | 9/2014 | Kindermann et al. |
| 2014/0292260 A1* | 10/2014 | Dyer ................... B60L 53/55 320/107 |
| 2015/0217654 A1 | 8/2015 | Woo et al. |
| 2017/0047679 A1 | 2/2017 | Garth |
| 2017/0229820 A1 | 8/2017 | Fuehrer et al. |
| 2017/0237205 A1 | 8/2017 | Fuehrer et al. |

FOREIGN PATENT DOCUMENTS

| | | |
|---|---|---|
| DE | 102010050562 B3 | 4/2012 |
| DE | 102010007975 B4 | 10/2012 |
| DE | 102011121133 A1 | 6/2013 |
| DE | 102013221651 A1 | 4/2015 |
| DE | 102014102197 A1 | 8/2015 |
| DE | 102014111185 A1 | 2/2016 |
| DE | 102014111831 A1 | 2/2016 |
| DE | 102015016267 A1 | 7/2016 |
| WO | WO 2015119791 A1 | 8/2015 |

* cited by examiner

FIG 8

PLUG-IN CONNECTOR PART WITH A COOLED CONTACT ELEMENT

CROSS-REFERENCE TO PRIOR APPLICATIONS

This application is a U.S. National Phase application under 35 U.S.C. § 371 of International Application No. PCT/EP2017/059216, filed on Apr. 19, 2017, and claims benefit to German Patent Application No. DE 10 2016 107 409.8, filed on Apr. 21, 2016. The International Application was published in German on Oct. 26, 2017 as WO 2017/182484 under PCT Article 21(2).

FIELD

The invention relates to a plug-in connector part for connection to a mating plug-in connector part.

BACKGROUND

A plug-in connector part of this kind comprises a housing that has a plug-in portion for plug-in connection to the mating plug-in connector part, and at least one contact element arranged on the plug-in portion and intended to electrically contact an associated mating contact element of the mating plug-in connector part.

A plug-in connector part of this kind can be used in particular as a charging plug or as a charging socket for charging an electrically powered vehicle (also referred to as an electric vehicle). In this case, for example, one end of a cable is connected to a charging station and the other end carries the plug-in connector part in the form of a charging plug which can be plugged into an associated mating plug-in connector part in the form of a charging socket on a vehicle, in order to thereby produce an electrical connection between the charging station and the vehicle.

Charging currents can in principle be transmitted as direct currents or as alternating currents, with in particular charging currents in the form of a direct current having a high current intensity, for example greater than 200 A or even greater than 300 A or even 350 A, and it being possible for these currents to lead to the cable, as well as a plug-in connector part connected to the cable, heating up.

A charging cable known from DE 10 2010 007 975 B4 has a cooling line which comprises a supply line and a return line for a coolant, and thus facilitates a flow of coolant back and forth in the charging cable. The cooling line of DE 10 2010 007 975 B4 is used both to dissipate heat losses produced in an energy storage of a vehicle, and to cool the cable per se.

In a charging system for charging an electric vehicle, heat is generated not only in the cable by means of which a charging plug is connected for example to a charging station, but is also generated at the charging plug and in particular inside the charging plug, for example on contact elements by means of which electrical contact with associated mating contact elements for example on a charging socket on an electric vehicle is produced when the charging plug is plugged into the charging socket. Contact elements of this kind, which are made of an electrically conductive metal material, for example a copper material, heat up when a charging current flows via the contact elements, the contact elements in principle being dimensioned depending on the charging current to be transmitted such that the contact elements have a sufficient current-carrying capacity, and a temperature increase on the contact elements is limited. In this case, a contact element is dimensioned so as to be larger the higher the charging current to be transmitted is.

However, there are limits to how much the size of the contact elements can be scaled with an increasing charging current, owing to the associated installation space requirement, the weight and the costs. There is therefore a need to transmit a high charging current using a contact element of relatively small dimensions.

In a charging system known from WO 2015/119791 A1 for charging an electric vehicle, coolant lines are guided inside a charging cable, by means of which coolant lines heat can also be dissipated from the region of a plug-in connector part connected to the charging cable.

In a charging system known from U.S. Pat. No. 5,909,099, charging currents are transmitted, using a transformer, via a core arranged in a plug-in connector part. A thermal conductor line for dissipating heat can be extended in the core.

SUMMARY

In an embodiment, the present invention provides a plug-in connector part for connection to a mating plug-in connector part, comprising: a housing which has a plug-in portion for plug-in connection to the mating plug-in connector part; at least one contact element arranged on the plug-in portion and configured to electrically contact an associated mating contact element of the mating plug-in connector part; a thermal conductor line connected to the at least one contact element; and a cooling body arranged in the housing and thermoconductively connected to the at least one contact element via the thermal conductor line in order to dissipate heat from the at least one contact element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a plug-in connector part comprising a contact element that can have a high current-carrying capacity, for example for use in a charging system for charging an electric vehicle.

According to an embodiment, the plug-in connector part comprises a thermal conductor line connected to the at least one contact element and a cooling body that is arranged in the housing and thermoconductively connected to the at least one contact element via the thermal conductor line in order to dissipate heat from the at least one contact element.

For the purpose of cooling in the plug-in connector part, which can for example be a charging plug or a charging socket within the context of a charging system for charging an electric vehicle, a cooling body can thus be provided which is connected to an associated contact element via a thermal conductor line and by means of which heat can be conducted away from the associated contact element. The contact element is therefore used as a heat source, and the cooling body in contrast as a heat sink. As a result of the cooling body being connected to the associated contact element via the thermal conductor line (also referred to as a "heat pipe"), the cooling body can be arranged so as to be spatially separate from the associated contact element inside the housing of the plug-in connector part and can therefore be placed in any location of this kind inside the housing where there is installation space available.

The plug-in connector part can for example have a plurality of contact elements arranged on the plug-in portion. If, for example, a direct current is intended to be transmitted, two contact elements can be provided which project into the plug-in portion and which can each engage with an associated mating contact element of an associated mating plug-in connector part. Each contact element is associated with a cooling body that is connected to the associated contact element via a (separate) thermal conductor line, such that the heat generated on the different contact elements can be conducted away via separate thermal conductor lines and by means of cooling bodies connected to the thermal conductor lines. This is then particularly advantageous when the thermal conductor lines and the cooling bodies are made of a metal material that has good thermal conductivity, in order to ensure electrical isolation between the contact elements and to not impair said isolation by the provision of the cooling bodies. As a result of separate thermal conductor lines and cooling bodies being provided for the individual contact elements, the contact elements are not interconnected so as to conduct electricity, such that no electrical contact is produced between different contact elements, even if the thermal conductor lines and the cooling bodies are made of an electrically conductive metal material.

The thermal conductor line can for example be designed as a solid metal wire or rod which extends between a contact element and the associated cooling body. In a particularly preferred embodiment, the thermal conductor line can also be what is referred to as a heat pipe, which can be used in the heat pipe or two-phase thermosyphon design. A heat pipe of this kind can have a very low thermal resistance and therefore a high thermal conductivity.

A heat pipe can for example contain a hermetically encapsulated volume and is preferably pipe-shaped. The volume of the heat pipe is filled with a working medium, for example water or ammonia, which fills up the volume in a partially liquid and partially vapor state. The operating principle of a heat pipe of this kind is in this case as follows: The working medium begins to evaporate as heat is introduced. As a result, the pressure in the vapor space is locally increased over the liquid level, and this leads to a small pressure drop inside the heat pipe. The vapor produced therefore flows to a location that has a lower temperature and condenses there, such that the temperature at this location is increased by the redundant condensation heat and the previously absorbed latent heat is released to the surroundings. The now liquid working medium returns, by means of gravity (thermosyphon) or capillary action (heat pipe), back to the location at which the heat was introduced. Whereas in heat pipes based on a two-phase thermosyphon design the medium circulates by means of gravity, the heat transfer medium in heat pipes based on the wick principle (by means of the effect of capillary action) flows such that heat pipes are position-independent.

A first end of the thermal conductor line associated with a contact element is advantageously connected to the contact element such that heat can be favorably conducted away from the contact element via the thermal conductor line. The thermal conductor line can be rigidly, for example integrally, connected to the contact element. However, it is also conceivable and possible for an (additional) connecting piece to be provided that is made of a material having good thermal conductivity, for example a metal material, and connected to the contact element. The thermal conductor line can in this case for example be plugged into an opening in the connecting piece and optionally additionally be welded such that the thermal conductor line is connected to the contact element via the connecting piece.

In contrast, a second end of the thermal conductor line that is remote from the first end can for example be plugged into an opening in the cooling body. The thermal conductor line is therefore interlockingly connected to the cooling body such that heat can be introduced into the cooling body via the thermal conductor line.

The cooling body is made, for example, of a solid metal material, is therefore designed as a solid body, and has a relatively high thermal capacity.

The opening in the cooling body can for example be a blind hole into which the thermal conductor line is plugged. The thermal conductor line is rigidly held on the cooling body by means of plug-in connection to the cooling body, it being possible for the thermal conductor line to be additionally welded to the cooling body.

It is conceivable for purely passive cooling to be provided via the cooling body, by heat being absorbed in the cooling body and radiated via the cooling body. In one advantageous embodiment, it can however be provided that the cooling body is actively cooled, by a coolant flowing around the cooling body or a coolant flowing through said body. By means of the coolant, for example a gaseous fluid, for example air, or a coolant liquid, for example water, heat can therefore be conducted away from the cooling body in order to thereby provide effective cooling on the cooling body and therefore facilitate favorable heat transport away from the contact elements of the plug-in connector part.

For example, the cooling body can comprise a fluid channel which extends through the length of the cooling body and through which a coolant can flow, such that heat is absorbed and transported away by the cooling body. For this purpose, a first coolant line for supplying a coolant and a second coolant line for conducting away the coolant after flowing through the cooling body can, for example, be (directly or indirectly) connected to the cooling body such that a coolant flow can be provided via which heat can be transported away by the cooling body.

In one specific embodiment, a cooling body can also comprise two or even more fluid channels through which a coolant can flow. The fluid channels can for example extend through the (solid) cooling body in parallel with one another, such that coolant can be conducted through the cooling body lengthways on different paths in order to thereby absorb heat into the cooling body.

In one embodiment, two fluid channels in the cooling body are fluidically interconnected via a deflection line. This makes it possible for a coolant to be introduced into a first fluid channel, such that the coolant flows along the first fluid channel, is conducted via the deflection line towards the second fluid channel and flows back through the cooling body via the second fluid channel. The fluid channels are therefore interconnected in series and make it possible for the coolant to flow through the cooling body in forward and reverse direction.

If a plurality of cooling bodies are provided which are associated with different contact elements, it is therefore conceivable and possible for a coolant to be conducted through the cooling body in series or in parallel. For this purpose, fluid channels in the cooling bodies are fluidically interconnected in series or in parallel, such that a coolant can be conducted towards the cooling bodies via a coolant line and can be conducted away from the cooling body via a second coolant line.

In one embodiment, fluid channels in different cooling bodies are fluidically interconnected in series. For this purpose, a fluid channel in a first cooling body associated with a first contact element can be connected via a deflection line to a fluid channel in a second cooling body associated with a second contact element. This makes it possible, for example, to introduce a coolant into the fluid channel in the first cooling body such that the fluid flows along the fluid channel in the first cooling body, is conducted via the deflection line towards the fluid channel in the second cooling body, and then flows through the fluid channel in the second cooling body. The fluid channels in the cooling bodies are therefore connected so as to form a serial coolant circle.

Two coolant lines can for example be guided in a cable connected to the plug-in connector part, which coolant lines are used for supplying and conducting away a coolant and therefore provide a coolant circuit on the plug-in connector part. If fluid channels in a plurality of cooling bodies are interconnected in series, a first coolant line for supplying a coolant can therefore for example be connected to a first cooling body, while a second coolant line for conducting away the coolant is for example connected to a second cooling body, fluid channels in the first cooling body and of the second cooling body being fluidically interconnected in series such that a supplied coolant is conducted via one or more fluid channels in the first cooling body towards one or more fluid channels in the second cooling body and is lastly conducted away via the second coolant line.

If a plurality of cooling bodies are provided which are associated with a plurality of contact elements, in one embodiment the cooling bodies can be interconnected via a connecting element that is made of an electrically non-conductive material, for example plastics material, and be held in position relative to one another. The cooling bodies are advantageously held at distance from one another by the connecting element such that the cooling bodies do not touch one another and are therefore in particular not in electrical contact with one another. If the cooling bodies are made of an electrically conductive metal material, this ensures that the electrical isolation of the individual contact elements of the plug-in connector part from one another is not impaired. Moreover, direct transfer of heat from one cooling body to another cooling body can thus be avoided.

Figure 1:
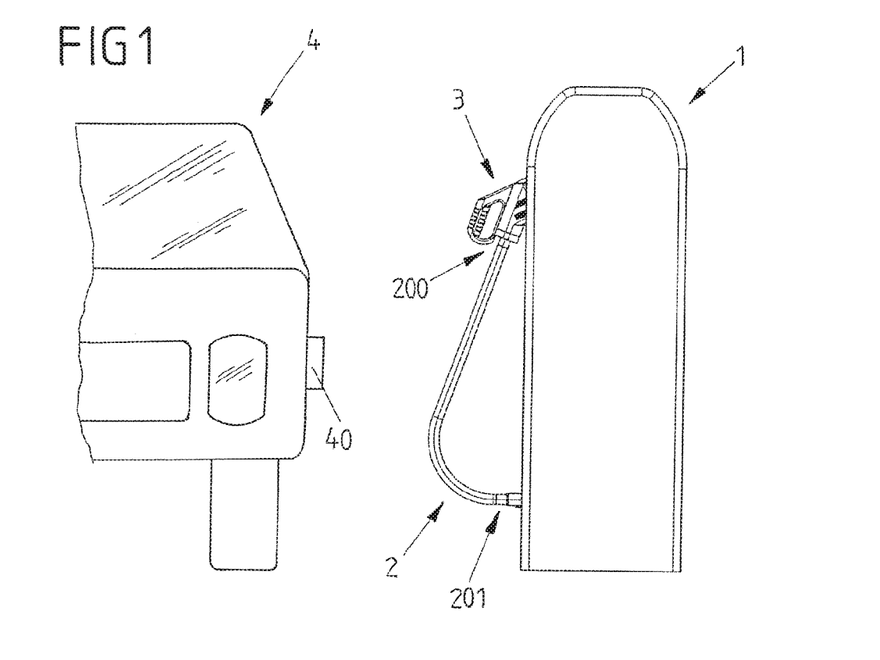
FIG. 1 is a view of a charging station comprising a cable arranged therein.

FIG. 1 shows a charging station 1 which is used to charge an electrically powered vehicle 4, also referred to as an electric vehicle. For this purpose, the charging station 1 is designed to provide a charging current in the form of an alternating current or a direct current and comprises a cable 2, of which one end 201 is connected to the charging station 1 and another end 200 is connected to a plug-in connector part 3 in the form of a charging plug.

Figure 2:
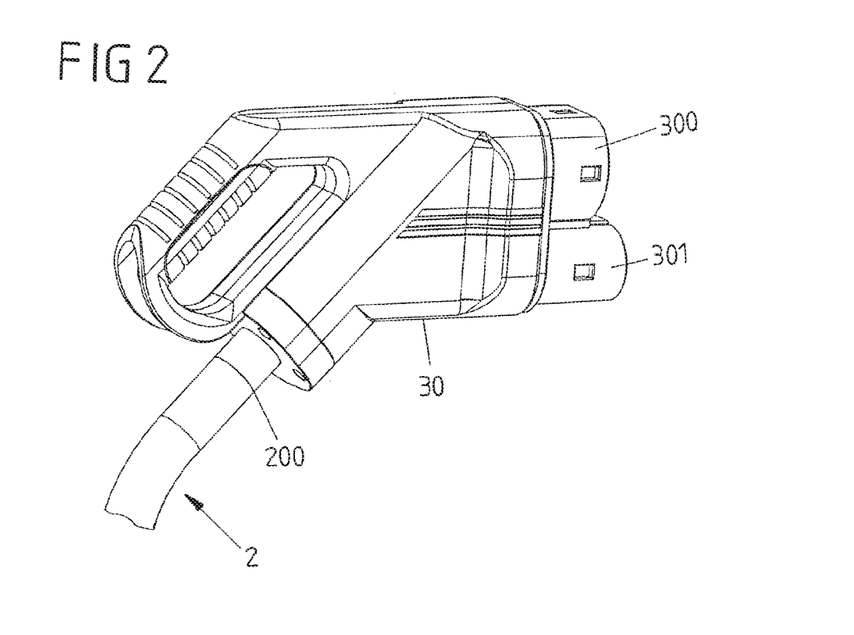
FIG. 2 is a view of a plug-in connector part in the form of a charging plug.

As can be seen from the enlarged view according to FIG. 2, the plug-in connector part 3 comprises plug-in portions 300, 301 on a housing 30, by means of which portions the plug-in connector part 3 can engage with an associated mating plug-in connector part 40 in the form of a charging socket on the vehicle 4 in a plug-in manner. In so doing, the charging station 1 can be electrically connected to the vehicle 4 in order to transmit charging currents from the charging station 1 to the vehicle 4.

In order to make it possible for the electric vehicle 4 to be charged quickly, for example within the context of what is referred to as a "fast charging process", the transmitted charging currents have a high amperage, for example greater than 200 A, optionally even in the range of 350 A or higher. High charging currents of this kind cause thermal losses on the cable 2 and also on the plug-in connector part 3 and the charging socket 40, which losses can lead to the cable 2, the plug-in connector part 3 and the charging socket 40 heating up.

The plug-in connector part 3 comprises a plurality of contact elements on the plug-in portions 300, 301 thereof. Two contact elements can for example be arranged on the plug-in portion 301 in order to transmit a charging current in the form of a direct current, while for example five contact elements are provided on the plug-in portion 300 so as to provide five load contacts, in order to transmit an (e.g. multiphase) alternating current.

Figure 3:
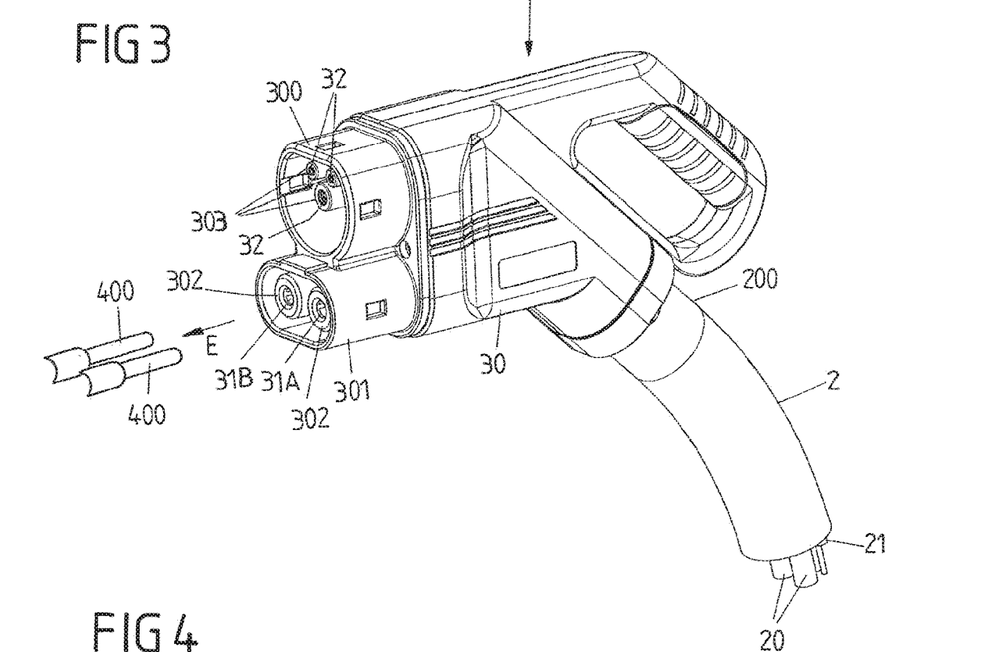
FIG. 3 is another perspective view of the plug-in connector part.

In one specific embodiment of a plug-in connector part, shown in FIG. 3, contact elements 31A, 31B are arranged on a lower plug-in portion 301 inside two plug-in pins 302 and are used to transmit a charging current in the form of a direct current. In contrast, contact elements 32 are arranged on the other, upper plug-in portion 300 in plug-in pins 303 and are used to transmit an alternating current. The plug-in connector part 3 is therefore designed as what is referred to as a combi-plug, which can optionally be used to transmit direct currents or alternating currents.

As shown schematically in FIG. 3, the contact elements 31A, 31B on the plug-in portion 301 of the plug-in connector part 3 can engage in a plug-in manner, in a plug-in direction E, with mating contact elements 400 in the form of contact pins on the charging socket 40, in order to electrically contact the contact elements 31A, 31B with the mating contact elements 400.

Load lines 20, 21 are guided in the cable 2, which load lines are used to transmit a load current to the plug-in connector part 3. A load line 20 is connected to each contact element 31A, 31B. A further load line 21 is used to supply an electric current to the contact elements 33 on the other, upper plug-in portion 300.

Figure 4:
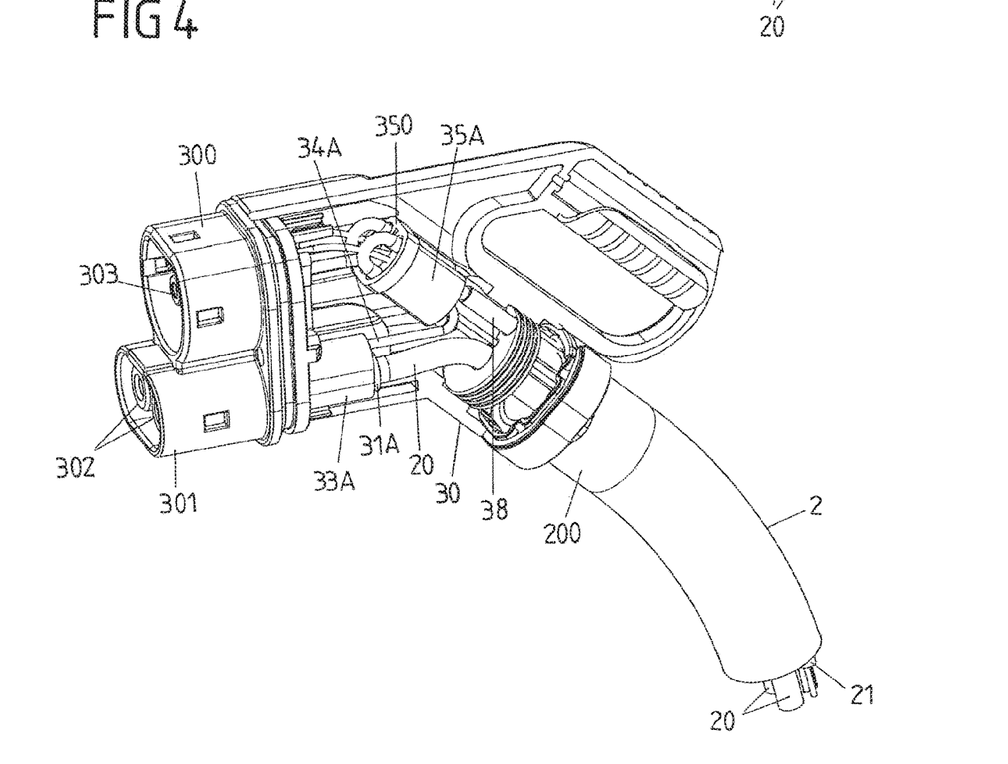
FIG. 4 is a partially cut out view of the plug-in connector part.

In the embodiment of the plug-in connector part 3 according to FIG. 3, in order to cause cooling on the contact elements 31A, 31B on the lower plug-in portion 301, cooling bodies 35A, 35B are provided which are connected to the contact elements 31A, 31B via thermal conductor lines 34A, 34B, as can be seen from the partial sectional view according to FIG. 4 and the views according to FIG. 5A, 5B to 8. Heat on the contact elements 31A, 31B can be absorbed via the thermal conductor lines 34A, 34B and conducted towards the cooling bodies 35A, 35B, in order to thereby dissipate heat from the contact elements 31A, 31B.

Figure 5A:
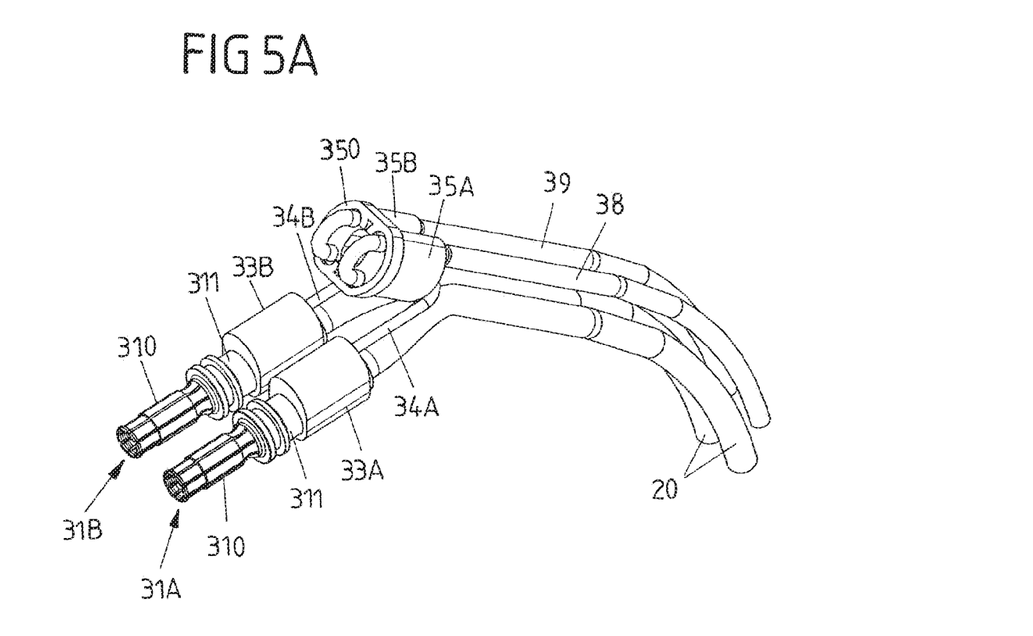
FIG. 5A is a separate view of an assembly comprising two contact elements of the plug-in connector part and a cooling device for cooling the contact elements.
Figure 5B:
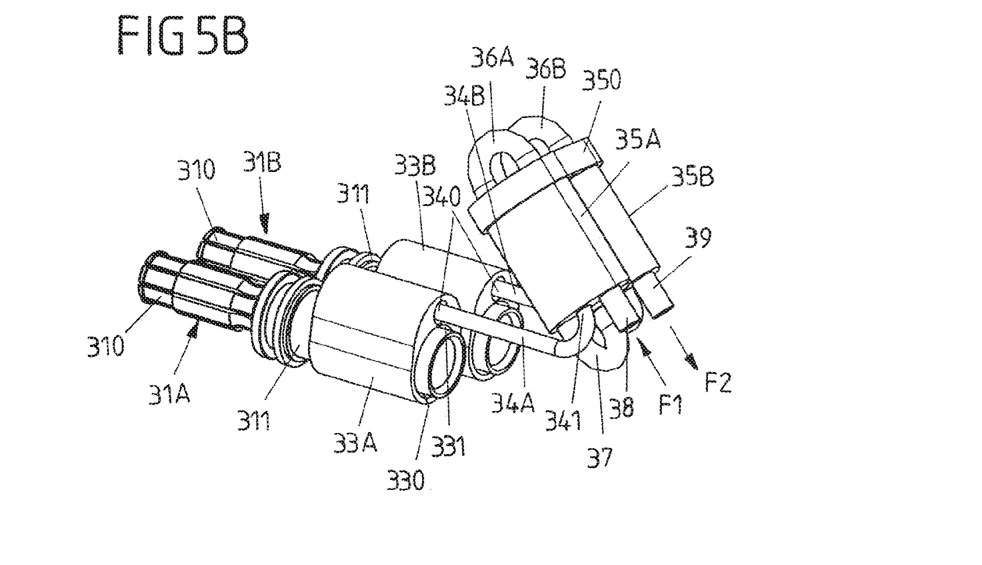
FIG. 5B is another view of the assembly according to FIG. 5A.
Figure 6A:
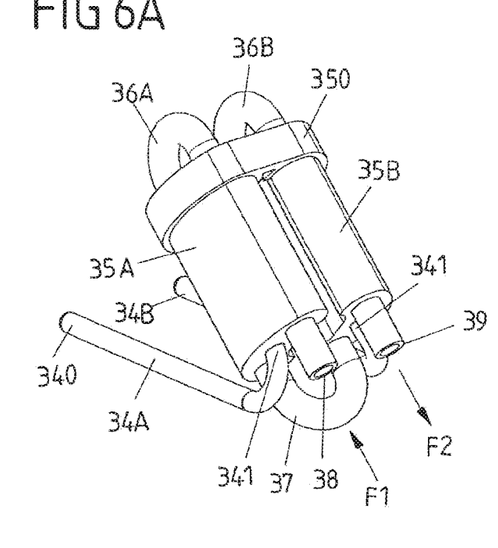
FIG. 6A is a separate view of the cooling device.
Figure 6B:
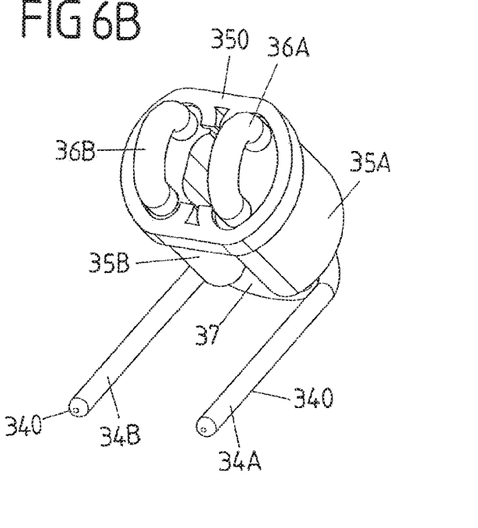
FIG. 6B is another view of the cooling device.

As can be seen from the views according to FIGS. 5A and 5B, each contact element 31A, 31B is associated with a cooling body 35A, 35B. Each contact element 31A, 31B has a socket portion 310 which is formed by resilient slats and to which a shaft 311 is connected. A connecting piece 33A, 33B is arranged on this shaft 311, by the cylindrical shaft 311 passing through an opening 330 in the connecting piece 33A, 33B. One end 340 of the thermal conductor line 34A, 34B associated with the relevant contact element 31A, 31B is plugged into an opening 331 in the connecting piece 33A, 33B and extends from the contact element 31A, 31B towards the associated cooling body 35A, 35B, into which an end 341 of the thermal conductor line 34A, 34B that is remote from the end 340 is plugged.

The contact element 31A, 31B is made of a metal, for example a copper material. In order to cause effective heat transfer from the contact element 31A, 31B, advantageously the connecting piece 33A, 33B, the thermal conductor line 34A, 34B and the cooling body 35A, 35B are likewise made of a metal, in particular a metal that has good thermal conductivity. The connecting piece 33A, 33B, the thermal conductor line 34A, 34B and the cooling body 35A, 35B are therefore designed as solid, metal parts, such that in particular the cooling body 35A, 35B has a relatively high thermal capacity.

Each contact element 31A, 31B is associated with a separate cooling body 35A, 35B. The individual cooling bodies 35A, 35B are held in position relative to one another by a connecting element 350 made of an electrically isolating material, for example plastics material, such that the cooling bodies 35A, 35B do not touch one another. The cooling bodies 35A, 35B of the individual contact elements 31A, 31B therefore being spatially separated from one another ensures that the electrical isolation between the contact elements 31A, 31B is not impaired by the cooling bodies 35A, 35B connected to the contact elements 31A, 31B.

The ends 341 of the thermal conductor lines 34A, 34B are plugged into openings 351 in the form of blind holes in the cooling bodies 35A, 35B and in so doing are rigidly connected to the associated cooling bodies 35A, 35B. Here the connection is such that heat can be favorably transmitted from the thermal conductor lines 34A, 34B to the cooling bodies 35A, 35B.

The connecting pieces 33A, 33B are rigidly, for example interlockingly, non-positively (by means of pressing) or integrally (e.g. by means of welding), connected to the shaft 311 of the associated contact element 31A, 31B in each case. Likewise, the thermal conductor lines 34A, 34B can be rigidly, e.g. integrally (e.g. by means of welding), connected at one end to the associated connecting piece 33A, 33B and at the other end to the associated cooling body 35A, 35B.

In the embodiment shown, the cooling bodies 35A, 35B, which are arranged inside the housing 30 as shown in FIG. 4, are actively cooled. For this purpose, the cooling bodies 35A, 35B, as can be seen in particular from FIGS. 7 and 8, each comprise two elongate fluid channels 352, 353 which extend in parallel with one another and through which a (gaseous or liquid) coolant can flow in order to absorb heat into the cooling bodies 35A, 35B and to dissipate heat away from the cooling bodies 35A, 35B.

Figure 7:
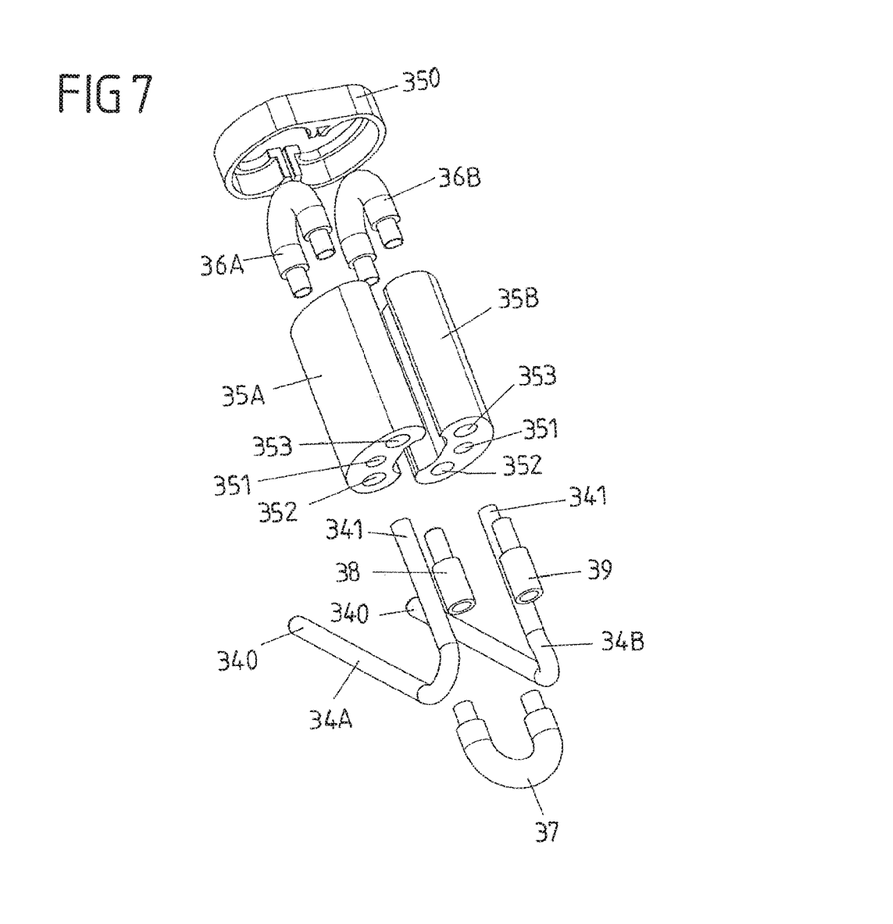
FIG. 7 is an exploded view of the cooling device.
Figure 8:
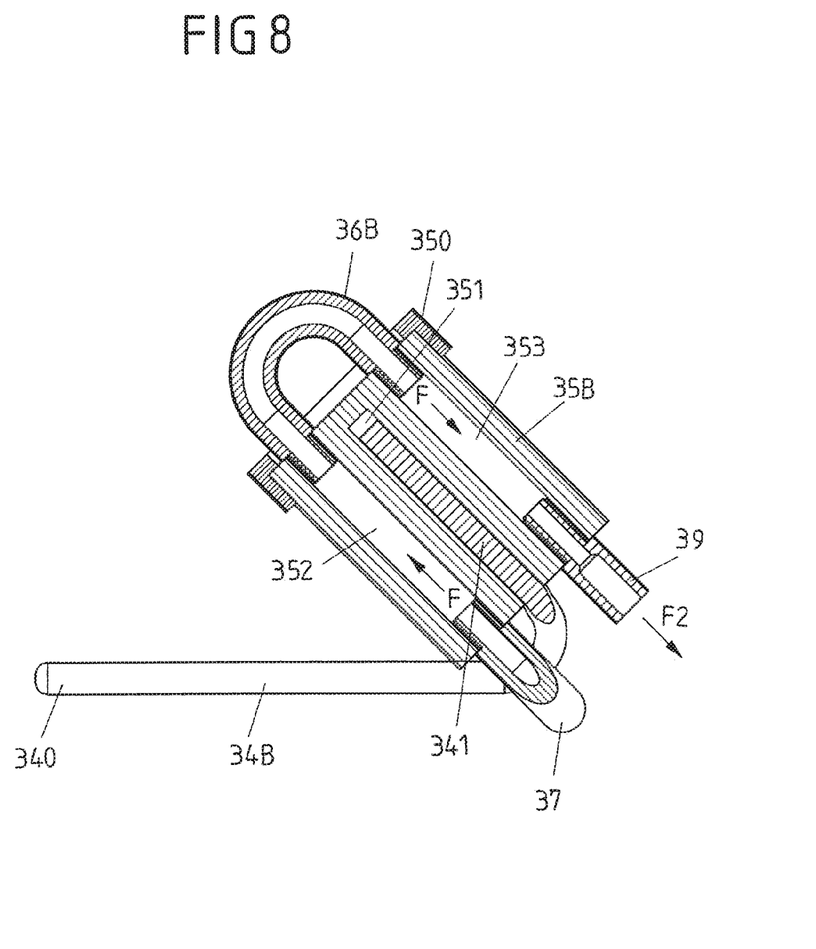
FIG. 8 is a sectional view through a cooling body of the cooling device.

The fluid channels 352, 353 of the different cooling bodies 35A, 35B can be interconnected in series or in parallel in order to provide a coolant circuit for cooling. It is also conceivable and possible for each cooling body 35A, 35B to be connected to its own coolant circuit. For this purpose, coolant lines 38, 39 can be connected to the cooling bodies 35A, 35B such that a coolant can be supplied in a direction of flow F1 via a coolant line 38 and can be conducted away again in a flow of direction F2 via another coolant line 39.

In the embodiment shown, the fluid channels 352, 353 of the coolant bodies 35A, 35B are fluidically interconnected in series such that a supplied coolant flows through the fluid channels 352, 353 in the cooling bodies 35A, 35B in series.

In the embodiment shown, for instance, the fluid channels 352, 353 in each cooling body 35A, 35B are fluidically interconnected via a deflection line 36A, 36B such that a coolant introduced into a fluid channel 353 is deflected via the deflection line 36A, 36B and flows back through the other fluid channel 352. The fluid channels 352, 353 are arranged on both sides of the opening 351 into which the associated thermal conductor line 34A, 34B is plugged, such that heat can be absorbed on both sides of the thermal conductor line 34A, 34B via the fluid channels 352, 353 and can be dissipated.

In addition, the fluid channel 352 of the one cooling body 35A and the fluid channel 352 of the other cooling body 35B are fluidically interconnected via a deflection line 37, such that a coolant can flow out of the fluid channel 352 of the one cooling body 35A via the deflection line 37 into the fluid channel 352 of the other cooling body 35B.

In order to complete the coolant circuit, a first coolant line 38 is connected to the fluid channel 353 in the one cooling body 35A and is used for example to supply a coolant. A further, second coolant line 39 is in contrast connected to the cooling body 353 of the other cooling body 35B and is used to conduct away the coolant. A coolant can therefore be supplied via the coolant line 38 and flow into the fluid channel 353 in the cooling body 35A. The coolant is conducted via the deflection line 36A into the fluid channel 352 in the cooling body 35A and from there via the diversion 37 into the fluid channel 352 in the cooling body 35B, flows via the fluid channel 352 in the cooling body 35B and the deflection line 36B in the direction of flow F (see FIG. 8) into the fluid channel 353 in the cooling body 35B and is conducted away via the coolant line 39. The fluid channels 352, 353 in the cooling bodies 35A, 35B are therefore flowed through in series, such that heat can be absorbed into the cooling bodies 35A, 35B and conducted away.

The coolant lines 38, 39 are laid in the cable 2 and surrounded by a cable conduit of the cable 2. In this way, the coolant lines 38, 39 are guided towards the charging station 1 and are connected for example to a coolant pump on the charging station 1, in order to cause a coolant flow through the coolant lines 38, 39.

The basic concept of the invention is not limited to the embodiments described above but can however also be implemented in a completely different manner.

In principle, all contact elements of the plug-in connector part can be cooled in the described manner. However, it is also conceivable and possible for only individual contact elements to be cooled.

The plug-in connector part can comprise one or more cooling bodies, in particular also more than two cooling bodies. In so doing, cooling can take place not only on contact elements provided for transmitting a direct current, but also on contact elements which are used to transmit an alternating current.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 charging station
2 charging cable
20, 21 load line
22 signal line
200, 201 end
3 charging plug
30 housing
300, 301 plug-in portion
302, 303 plug-in pins
31A, 31B contact element
310 socket portion
311 shaft
32 contact element
33A, 33B connecting piece
330, 331 opening
34A, 34B thermal conductor line
340, 341 end
35A, 35B cooling body
350 connecting element
351 opening (blind hole)
352, 353 fluid channel
36A, 36B deflection line
37 deflection line
38, 39 coolant line
4 vehicle
40 charging socket
400 mating contact element
E plug-in direction
F, F1, F2 direction of flow

The invention claimed is:

1. A plug-in connector part for connection to a mating plug-in connector part, comprising:
   a housing which has a plug-in portion for plug-in connection to the mating plug-in connector part;
   at least one contact element arranged on the plug-in portion and configured to electrically contact an associated mating contact element of the mating plug-in connector part;
   a thermal conductor line connected to the at least one contact element; and
   a cooling body arranged in the housing and thermoconductively connected to the at least one contact element via the thermal conductor line in order to dissipate heat from the at least one contact element,
   wherein a first end of the thermal conductor line is plugged into an opening in a metal connecting piece and is connected to the associated contact element via the connecting piece.

2. The plug-in connector part according to claim 1, wherein the plug-in connector part has a plurality of contact elements arranged on the plug-in portion, each contact element being associated with a cooling body that is thermoconductively connected to the associated contact element via the thermal conductor line.

3. The plug-in connector part according to claim 1, wherein the thermal conductor line and/or the cooling body are comprised of metal.

4. The plug-in connector part according to claim 1, wherein a second end of the thermal conductor line is plugged into an opening in the cooling body.

5. The plug-in connector part according to claim 1, wherein the cooling body has a fluid channel through which a coolant can flow.

6. The plug-in connector part according to claim 1, wherein the cooling body has two fluid channels which are fluidically interconnected via a deflection line connected to the cooling body.

7. The plug-in connector part according to claim 1, wherein a fluid channel of a first cooling body associated with a first contact element is connected via a deflection line to a fluid channel of a second cooling body associated with a second contact element.

8. The plug-in connector part according to claim 7, wherein a first coolant line that is guided in a cable connected to the plug-in connector part is connected to the first cooling body in order to supply a coolant, and a second coolant line that is guided in the cable is connected to the second cooling body in order to conduct away the coolant.

9. The plug-in connector part according to claim 1, further comprising a plurality of cooling bodies interconnected via a connecting element and held at distance from one another by the connecting element such that the cooling bodies do not touch one another.

* * * * *